(12) United States Patent
Kawasaki

(10) Patent No.: US 10,477,597 B2
(45) Date of Patent: Nov. 12, 2019

(54) COMMUNICATION APPARATUS AND CONTROL METHOD FOR CONTROLLING THE SAME

(71) Applicant: CANON KABUSHIKI KAISHA, Tokyo (JP)

(72) Inventor: Hiroki Kawasaki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/462,539

(22) Filed: Mar. 17, 2017

(65) Prior Publication Data

US 2017/0280488 A1 Sep. 28, 2017

(30) Foreign Application Priority Data

Mar. 24, 2016 (JP) .................. 2016-060646

(51) Int. Cl.
| | | |
|---|---|---|
| *H04W 4/00* | (2018.01) | |
| *H04W 76/11* | (2018.01) | |
| *H04L 29/12* | (2006.01) | |
| *H04W 12/04* | (2009.01) | |
| *H04W 84/12* | (2009.01) | |

(52) U.S. Cl.
CPC ......... *H04W 76/11* (2018.02); *H04L 61/2007* (2013.01); *H04W 12/04* (2013.01); *H04W 84/12* (2013.01)

(58) Field of Classification Search
CPC ...... H04W 72/04; H04W 88/08; H04W 76/00
See application file for complete search history.

(56) References Cited

U.S. PATENT DOCUMENTS

| | | | | |
|---|---|---|---|---|
| 8,484,707 B1* | 7/2013 | Bertz | ............... | B60R 25/24 |
| | | | | 705/65 |
| 2007/0039042 A1* | 2/2007 | Apelbaum | .............. | G06F 21/46 |
| | | | | 726/6 |
| 2013/0239104 A1* | 9/2013 | Savant | ................. | G06F 21/121 |
| | | | | 717/178 |
| 2013/0291074 A1* | 10/2013 | Dittrich | .................. | G06F 21/36 |
| | | | | 726/5 |
| 2014/0115708 A1 | 4/2014 | Terwilliger | | |
| 2014/0168033 A1* | 6/2014 | Zou | ....................... | G06F 3/1462 |
| | | | | 345/2.3 |
| 2014/0289870 A1* | 9/2014 | Selander | ................. | G06F 21/46 |
| | | | | 726/28 |

(Continued)

FOREIGN PATENT DOCUMENTS

| | | | |
|---|---|---|---|
| CN | 103425956 A | 12/2013 | |
| JP | 2006-001063 A | 1/2006 | |

(Continued)

OTHER PUBLICATIONS

Telepaste—QR Code Reader & Generator [online], reliphone, https://reliphone.jp/telepaste, Jan. 30, 2015, pp. 1-4.

(Continued)

*Primary Examiner* — Siren Wei
(74) *Attorney, Agent, or Firm* — Canon U.S.A., Inc. IP Division

(57) ABSTRACT

A communication apparatus reads a two-dimensional code displayed by an external apparatus, and then stores in a clipboard a security key, which is included in the read two-dimensional code, for connecting to an access point.

13 Claims, 11 Drawing Sheets

(56) References Cited

U.S. PATENT DOCUMENTS

| 2015/0097689 A1* | 4/2015 | Logue | H04W 4/70 |
| | | | 340/632 |
| 2015/0128230 A1* | 5/2015 | Chang | H04W 12/04 |
| | | | 726/5 |

FOREIGN PATENT DOCUMENTS

| JP | 2006-261938 A | 9/2006 |
| JP | 2014-116871 A | 6/2014 |

OTHER PUBLICATIONS

Moga Mobo: [Android] Attempted to copy strings to clipboard. [online], program study record by mogomogo programmer@mogakana., May 17, 2011, http://mogakana.blogspot.jp/so11/05/android_17.html, pp. 1-4.

Connecting Wi-Fi Devices: "Easy" Wireless Connection of Smartphones and Printers by Automatic Connection, Nikkei PC Beginners vol. 3, No. 9, Nikkie Business Publications Inc., Aug. 13, 2012, pp. 34-41.

* cited by examiner

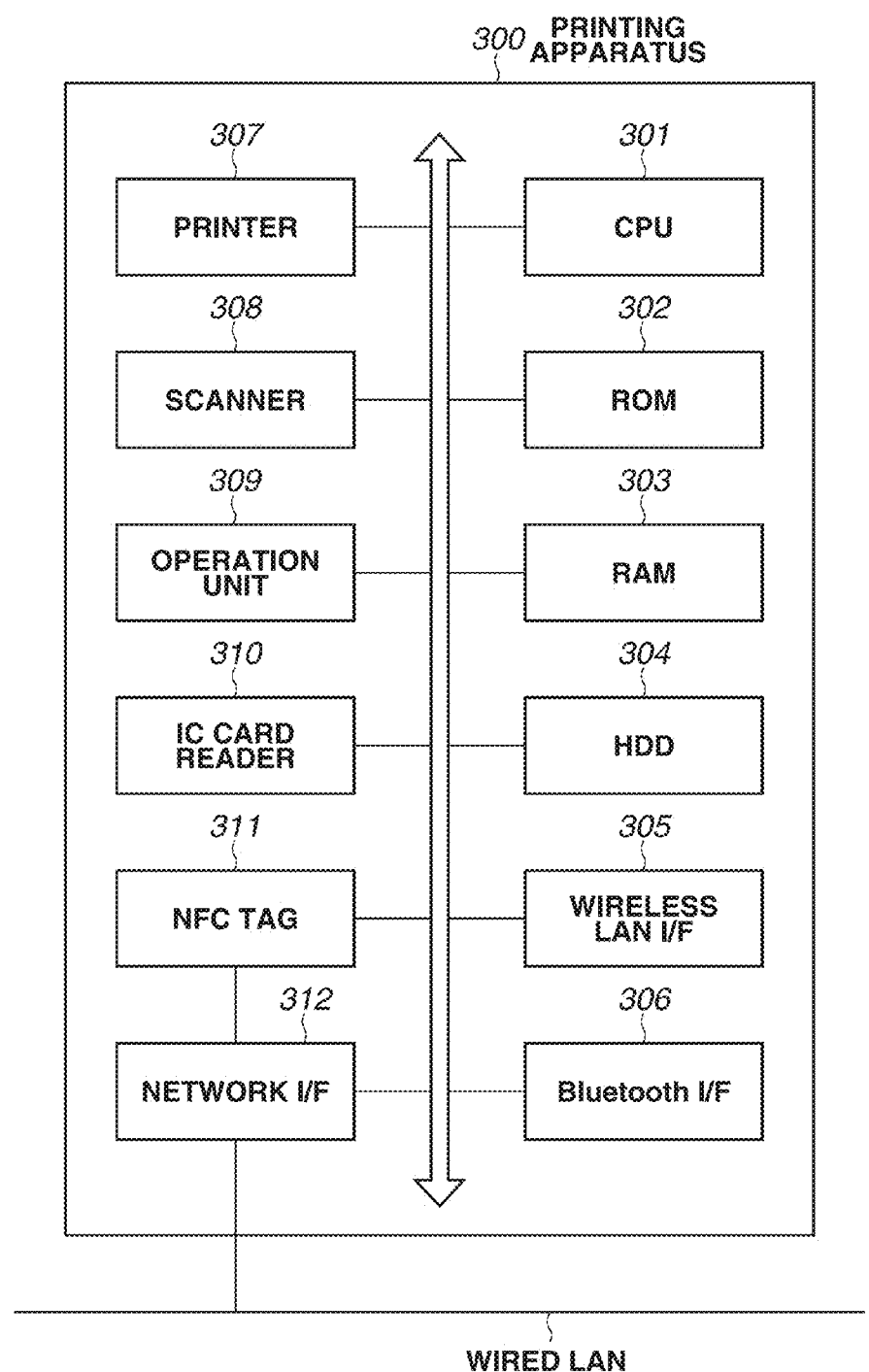

400 CONNECTION SCREEN

410 CONNECTION SCREEN

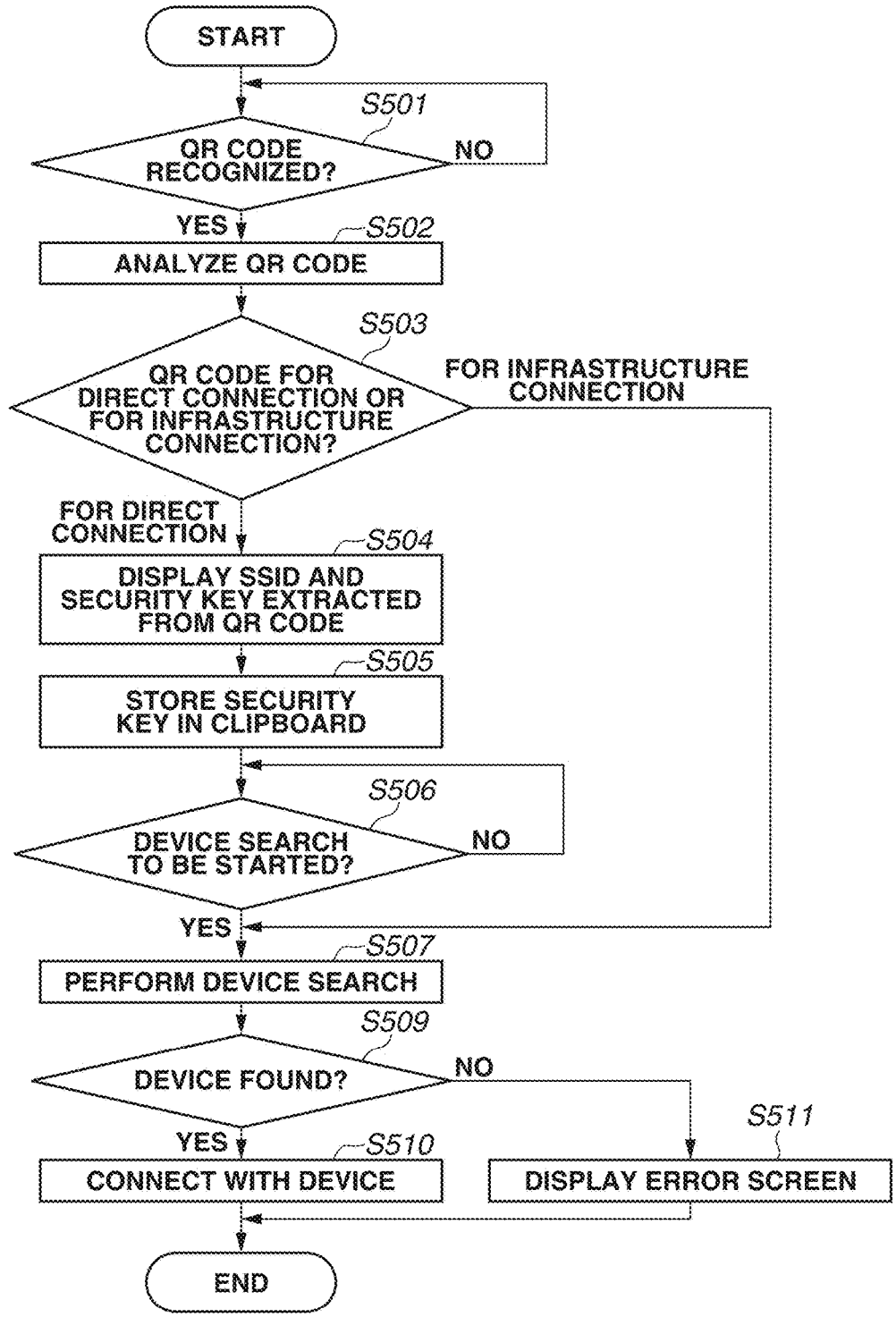

600 APPLICATION SCREEN

610 APPLICATION SCREEN

620 APPLICATION SCREEN

700 Wi-Fi SETTING SCREEN

710 Wi-Fi SETTING SCREEN

720 Wi-Fi SETTING SCREEN

730 Wi-Fi SETTING SCREEN

800 APPLICATION SCREEN

810 APPLICATION SCREEN

820 APPLICATION SCREEN

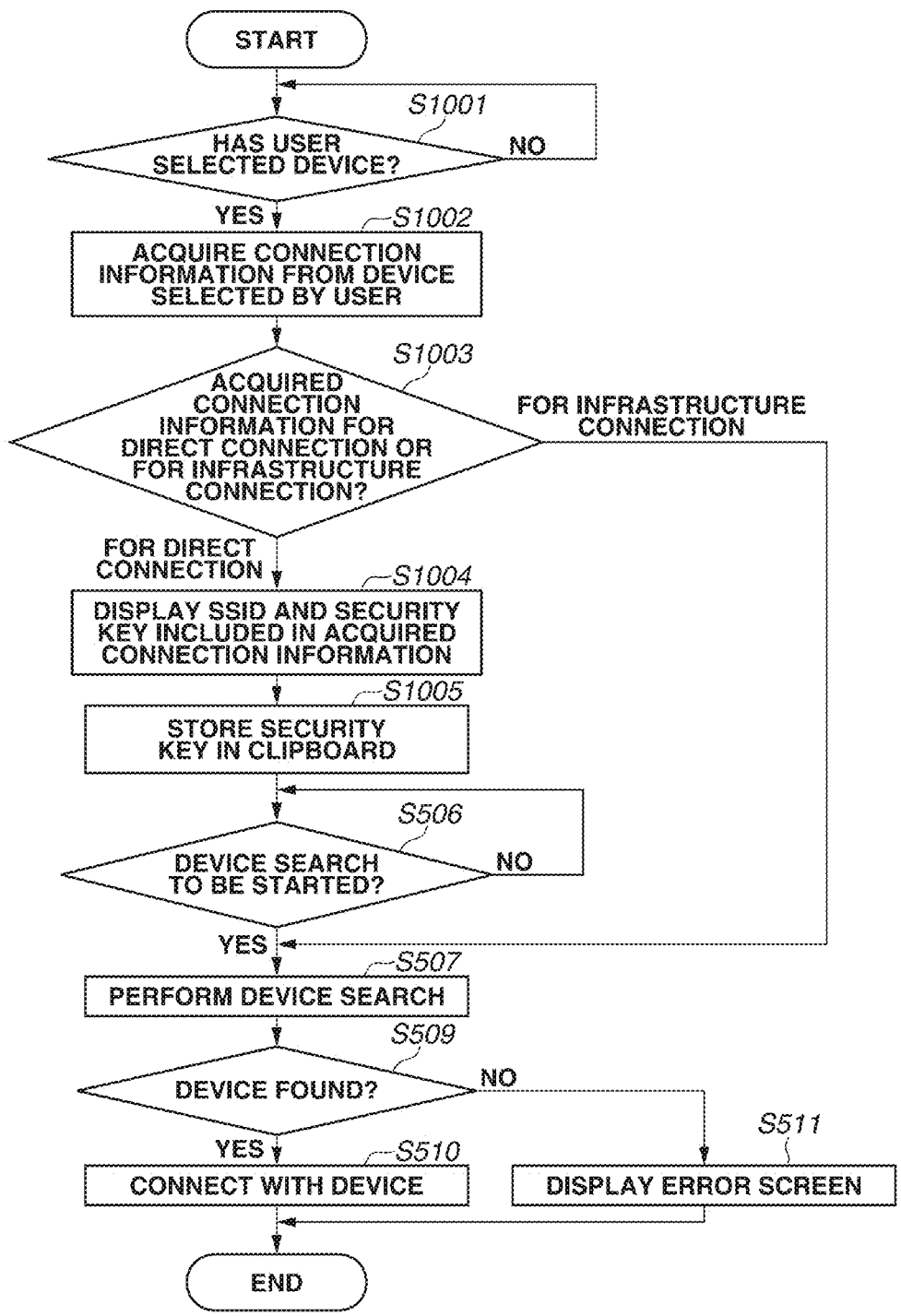

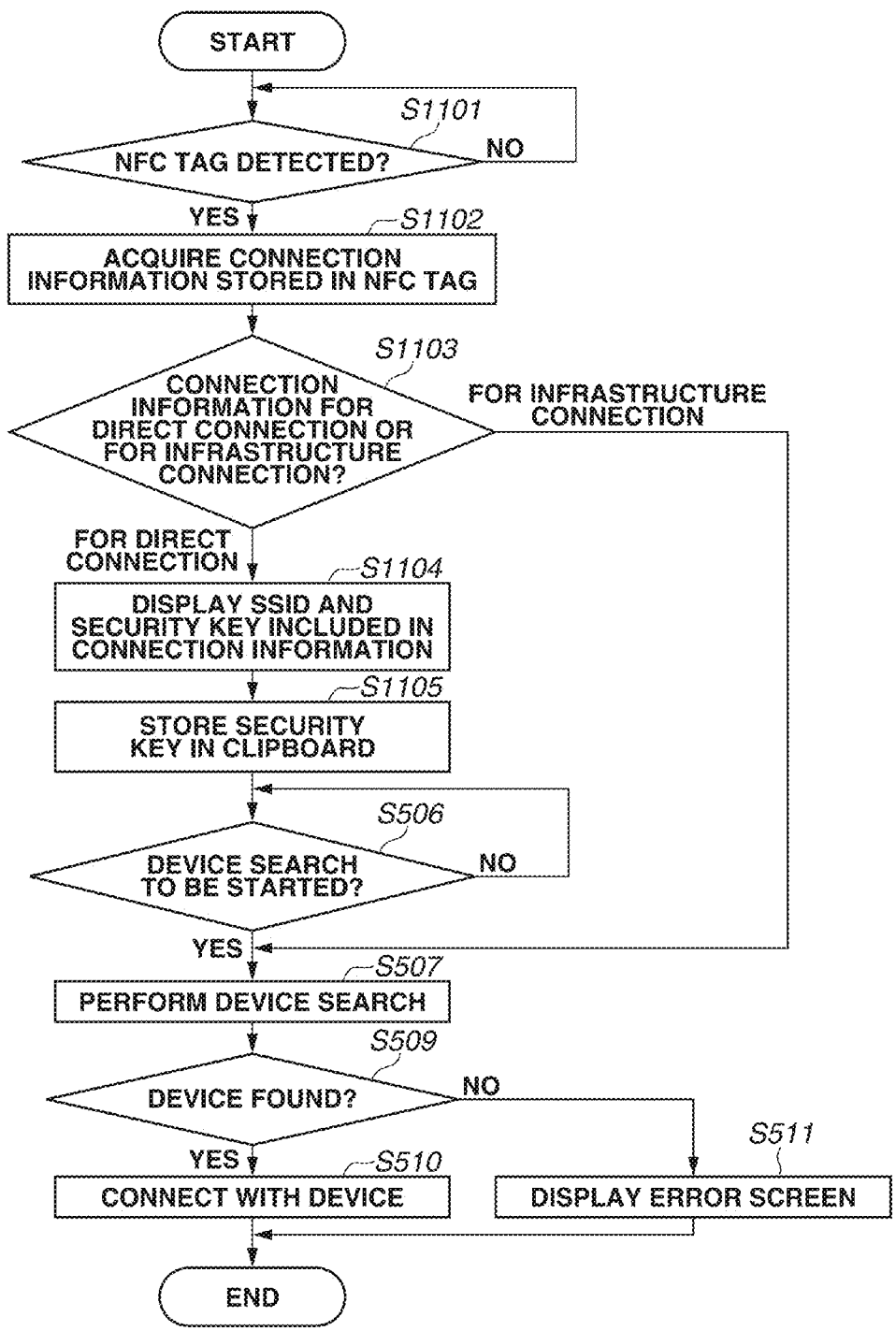

COMMUNICATION APPARATUS AND CONTROL METHOD FOR CONTROLLING THE SAME

BACKGROUND OF THE INVENTION

Field of the Invention

The present invention relates to a communication apparatus having a wireless local area network (LAN) function, and a control method for controlling the communication apparatus.

Description of the Related Art

A communication apparatus (for example, a smart phone) having a wireless LAN function can perform wireless communication with other devices by connecting to an access point. Japanese Patent Application Laid-Open No. 2006-261938 discusses a device for displaying a Quick Response (QR) code (registered trademark) including connection information for connecting to an access point. The communication apparatus reads a QR code by using a camera function to acquire connection information included in the QR code. Then, the communication apparatus connects to an access point indicated by the acquired connection information.

The method used by the communication apparatus to acquire connection information from an external source is not limited to the method using a QR code, and various methods are known. For example, it is known that the communication apparatus acquires connection information from an external source using Near Field Communication (NFC) or Bluetooth Low Energy (BLE).

A user can install various applications in a communication apparatus, such as a smart phone. Some applications control the communication apparatus to acquire connection information from an external source by using the above-described QR code, NFC, and BLE. However, some communication apparatuses inhibit applications from changing communication settings including a setting for connection to an access point.

Such communication apparatuses can still allow an application to display connection information acquired from an external source. In this case, a user of the communication apparatus checks the displayed connection information, and manually instructs the communication apparatus to wirelessly connect to an access point. However, a security key for connecting to an access point is generally a meaningless random alphanumeric character string. Even if the application displays such a security key, the user will find it difficult to memorize the security key and troublesome to take a note of the security key. If the user makes an attempt to input the characters of the security key one by one to the communication apparatus, an input error is likely to occur.

SUMMARY OF THE INVENTION

According to an aspect of the present invention, a control method for controlling a communication apparatus having a wireless LAN function for connecting to an access point and performing wireless communication, the control method including analyzing a two-dimensional code read by the communication apparatus, and storing in a clipboard a security key for connecting to an access point obtained by analyzing the two-dimensional code.

Further features of the present invention will become apparent from the following description of exemplary embodiments with reference to the attached drawings.

BRIEF DESCRIPTION OF THE DRAWINGS

FIG. 3 is a diagram illustrating a hardware configuration of a printing apparatus.

FIG. 5 is a flowchart illustrating processing performed by the portable terminal.

FIG. 10 is a flowchart illustrating processing performed by the portable terminal.

FIG. 11 is a flowchart illustrating processing performed by the portable terminal.

DESCRIPTION OF THE EMBODIMENTS

A best mode for carrying out the present invention will be described below with reference to the accompanying drawings. The following exemplary embodiments do not limit the present invention within the scope of the claims. Not all of the combinations of the features described in the exemplary embodiments are indispensable to the solutions for the present invention.

A communication system includes a portable terminal 100 and a printing apparatus 300. The printing apparatus 300 displays a QR code including information for allowing the portable terminal 100 to wirelessly connect to the printing apparatus 300. A user of the portable terminal 100 reads the QR code displayed by the printing apparatus 300, by using the camera of the portable terminal 100. The portable terminal 100 is characterized in that a security key for connecting to an access point is extracted from the read QR code and the extracted security key is stored in the clipboard. This allows the user to input the security key stored in the clipboard by performing a paste operation in a setting screen. Therefore, user-friendliness is improved. The above-described processing will be described in detail below.

Figure 1:
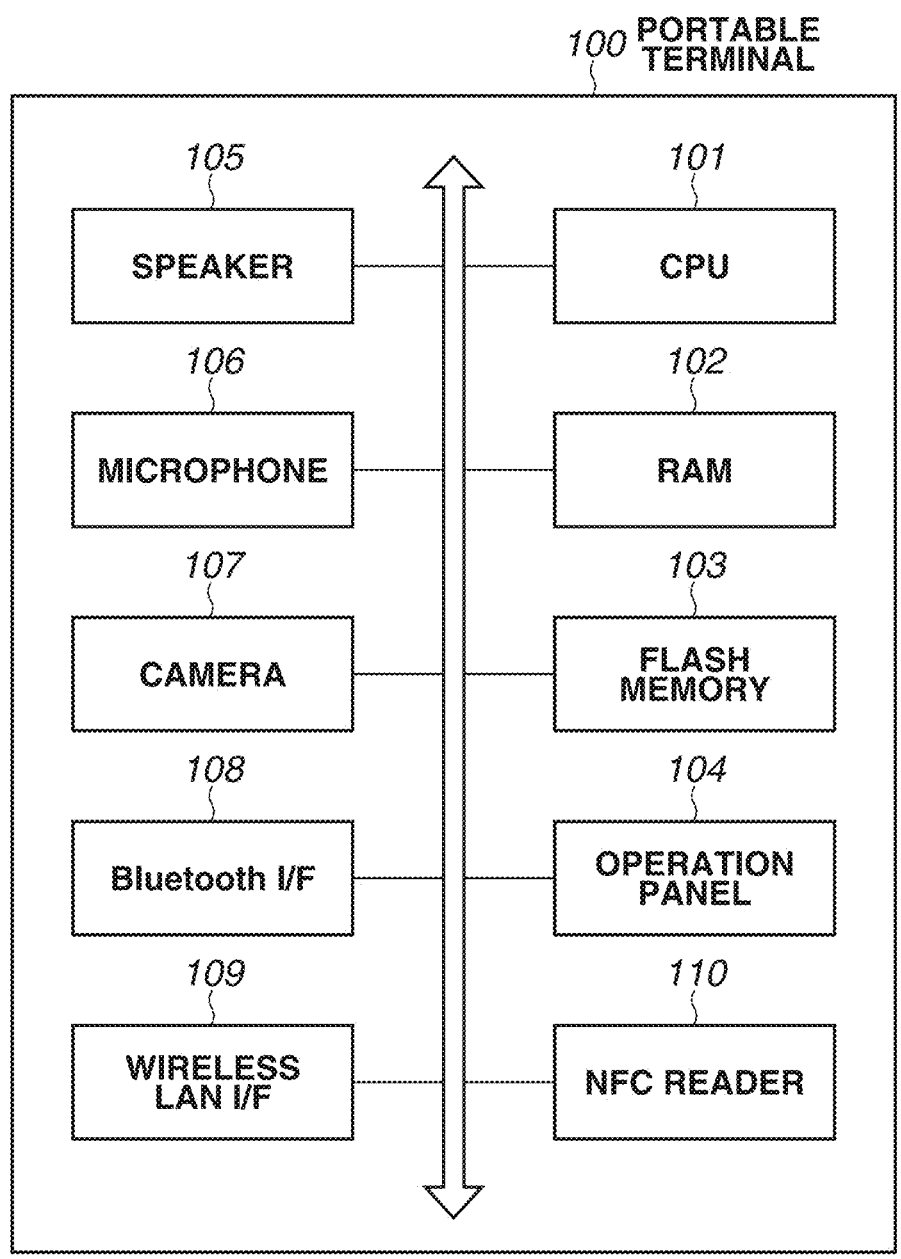
FIG. 1 is a diagram illustrating a hardware configuration of a portable terminal.

A hardware configuration of the portable terminal 100 will be described below with reference to FIG. 1. Although a smart phone is assumed as the portable terminal 100 according to a first exemplary embodiment, other communication apparatuses having a wireless LAN function and a function of reading a QR code (described below) may also be assumed as the portable terminal 100. Thus, a portable terminal 100 is an example of a communication apparatus.

A central processing unit (CPU) 101 reads a control program stored in a flash memory 103 and executes various processing for controlling operations of the portable terminal 100. A random access memory (RAM) 102 is used as the main memory of the CPU 101 and a temporary storage area, such as a work area. The flash memory 103 is a nonvolatile storage medium for storing a control program of the portable terminal 100 and various data, such as photographs and electronic documents.

Although, in the portable terminal 100 according to the present exemplary embodiment, one CPU executes each piece of processing illustrated in flowcharts (described below), other modes may be used. For example, a plurality of CPUs may collaboratively execute each piece of processing illustrated in flowcharts (described below). Further, a hardware circuit, such as an application specific integrated circuit (ASIC) may execute part of processing in flowcharts (described below).

An operation panel 104 is provided with a touch-panel function for detecting touch operations of the user and displays various screens. By performing a touch operation on the operation panel 104, the user can input a desired operating instruction to the portable terminal 100. The portable terminal 100 is provided with hardware keys (not illustrated). The user can also input an operating instruction to the portable terminal 100 by using the hardware keys.

The user uses a speaker 105 and a microphone 106 when making a call to other portable terminals and fixed-line telephones. A camera 107 captures an image in response to an imaging capturing instruction from the user. A photograph captured by the camera 107 is stored in a predetermined area of the flash memory 103. The camera 107 also has a function of reading a QR code.

A bluetooth interface (I/F) 108 performs wireless communication conforming to Bluetooth (registered trademark). A wireless LAN I/F 109 is provided with a wireless LAN function and performs wireless communication conforming to a Wi-Fi standard, such as the Institute of Electrical and Electronics Engineers (IEEE) 802.11a/b/g/n/ac standard. An NFC reader 110 performs short-distance wireless communication conforming to NFC to read tag information stored in an NFC tag provided on an external apparatus (for example, the printing apparatus 300).

Figure 2:
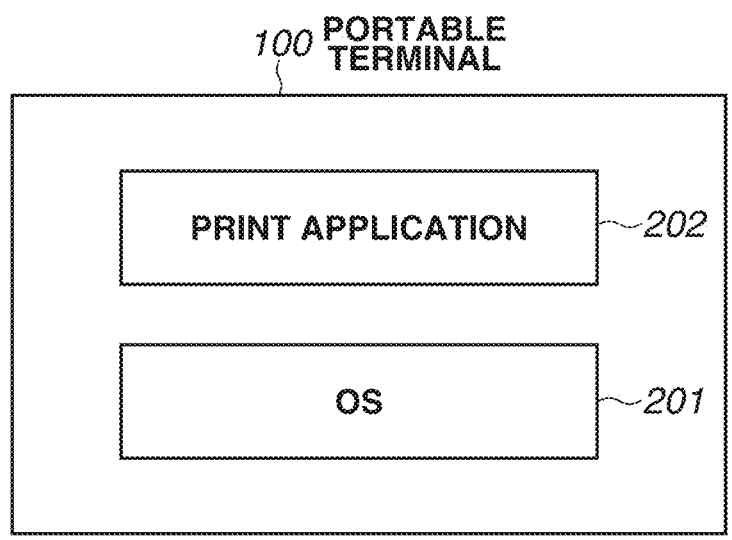
FIG. 2 is a diagram illustrating a software configuration of the portable terminal.

A software configuration of the portable terminal 100 will be described below with reference to FIG. 2. FIG. 2 is a functional block diagram implemented when the CPU 101 executes a control program stored in the flash memory 103.

An operating system (OS) 201 is software for controlling operations of the portable terminal 100. Diverse applications including a print application 202 (described below) can be installed in the portable terminal 100. The OS 201 controls operations of the portable terminal 100 according to an instruction received from each application and according to a user's operating instruction input via the operation panel 104.

The OS 201 provides a clipboard for use by the user. The clipboard serves as a storage area for temporarily storing information obtained through a copy operation by the user. The clipboard is a storage area provided in the RAM 102 or the flash memory 103. Information stored in the clipboard is pasted (written) on an area specified by the user, through a paste operation by the user. One piece of information can be stored in the clipboard. If the user performs a subsequent copy operation in a state where information is already stored in the clipboard, the information stored in the clipboard will be overwritten by a new piece of information.

The print application 202 is an application for providing the user with a printing function. The print application 202 requests the OS 201 to analyze a QR code read by the portable terminal 100, search for a printing apparatus, generate print data, and transmit the generated print data. The print application 202 further extracts, from the QR code, a security key required for connection to an access point, and stores the extracted security key in the clipboard.

Although various applications are installed in the portable terminal 100 in addition to the print application 202, descriptions of other applications will be omitted.

A hardware configuration of the printing apparatus 300 will be described below with reference to FIG. 3. The printing apparatus 300 is an example of a device.

The CPU 301 reads a control program stored in a read only memory (ROM) 302 and executes various processing for controlling operations of the printing apparatus 300. The ROM 302 stores a control program. A random access memory (RAM) 303 is used as the main memory of the CPU 301 and a temporary storage area, such as a work area. A hard disk drive (HDD) 304 is a nonvolatile storage medium storing various data.

A wireless LAN I/F 305 has a wireless LAN function and performs wireless communication conforming to a Wi-Fi standard, such as the IEEE 802.11a/b/g/n/ac standard. The wireless LAN I/F 305 can operate in a software access point mode. When the wireless LAN I/F 305 operates in the software access point mode, the printing apparatus 300 generates a Service Set Identifier (SSID) and a security key and operates like an access point. When the portable terminal 100 connects to an access point indicated by an SSID generated by the printing apparatus 300, wireless connection between the portable terminal 100 and the printing apparatus 300 is established. The software access point mode is an example of a direct wireless communication function with which the portable terminal 100 and the printing apparatus 300 establish wireless connection to each other without intervention of a relay apparatus such as an access point. The direct wireless communication function is not limited to the software access point mode and may be Wi-Fi Direct.

A bluetooth I/F 306 performs bluetooth wireless communication. An NFC tag 311 includes a memory for storing information. An external apparatus (for example, the portable terminal 100) can read information stored in the memory through NFC short-distance wireless communication. A network I/F 312 can communicate with an external apparatus (for example, a personal computer (PC)) on a wired LAN.

A printer 307 performs print processing on a sheet based on print data received by the wireless LAN I/F 305 and the network I/F 312. A scanner 308 reads a document placed by the user to generates a document image. The document image generated by the scanner 308 is printed by the printer 307 (what is called copy processing) or accumulated in the HDD 304.

An operation unit 309 includes a liquid crystal display unit having a touch panel function and a keyboard, and displays various operation screens. The user can input an instruction and information to the printing apparatus 300 via the operation unit 309. An IC card reader 310 reads user information from an IC card. The printing apparatus 300 performs authentication processing using user information read by the IC card reader 310.

To improve user-friendliness when the portable terminal 100 and the printing apparatus 300 establish connection to each other, the printing apparatus 300 displays, as a QR code, information required for connection between the portable terminal 100 and the printing apparatus 300. The portable terminal 100 reads the QR code displayed by the printing apparatus 300, by using the camera 107.

Figure 4A:
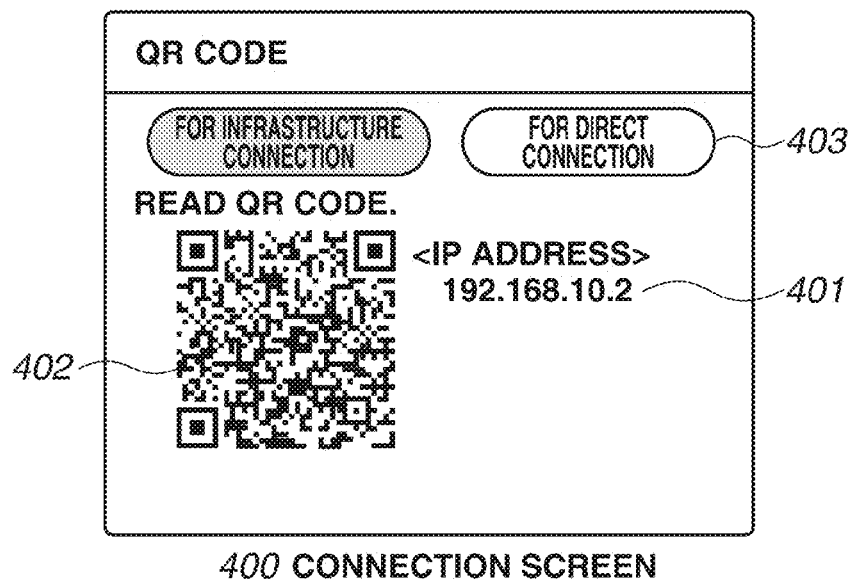
FIGS. 4A and 4B are diagrams each illustrating a screen displayed by the printing apparatus.
Figure 4B:
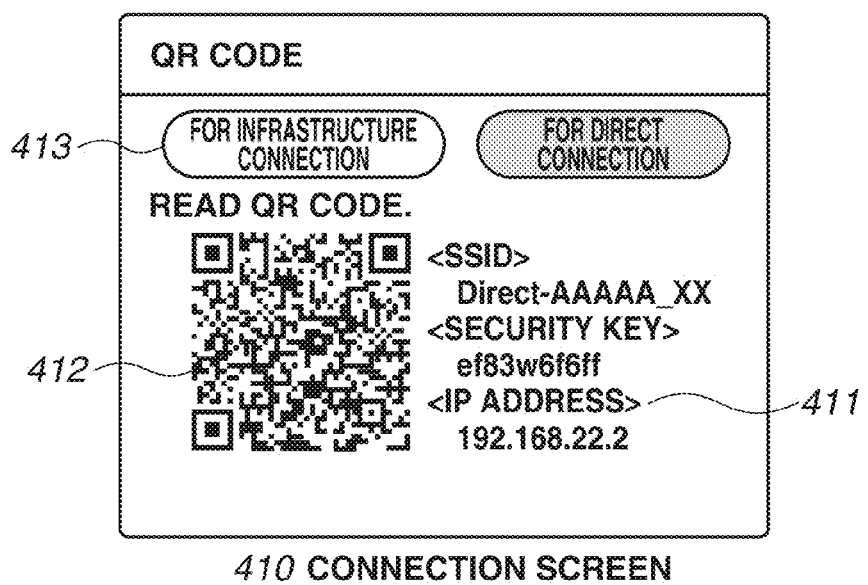

FIGS. 4A and 4B illustrate examples of different types of QR codes displayed by the printing apparatus 300. The printing apparatus 300 can display two different types of QR codes: a QR code for infrastructure connection and a QR code for direct connection. A QR code is an example of a two-dimensional code, and other types of two-dimensional codes are also applicable. A bar code may be used instead of a two-dimensional code.

A connection screen 400 illustrated in FIG. 4A displays a QR code for infrastructure connection. The connection screen 400 is displayed by the operation unit 309 of the printing apparatus 300. The QR code for infrastructure connection includes an Internet Protocol (IP) address of the printing apparatus 300, and does not include an SSID and a security key of an access point for allowing the portable terminal 100 to wirelessly connect to the printing apparatus 300. After reading the QR code for infrastructure connection, the portable terminal 100 performs device search using an IP address included in the QR code. Then, when the portable terminal 100 finds the device having the IP address included in the QR code as a result of device search, the portable terminal 100 establishes connection to the found device. To establish connection between the portable terminal 100 and the printing apparatus 300 by using the QR code for infrastructure connection, it is necessary to make the portable terminal 100 participate in the network in which the printing apparatus 300 has already participated. If the portable terminal 100 has not participated in the network in which the printing apparatus 300 has already participated, it is not possible to establish connection between the portable terminal 100 and the printing apparatus 300 even by using a QR code for infrastructure connection.

An item 401 in the connection screen 400 illustrated in FIG. 4A indicates the IP address of the printing apparatus 300. A QR code 402 is a QR code for infrastructure connection. Since the QR code 402 includes the IP address of the printing apparatus 300, the portable terminal 100 can acquire the IP address of the printing apparatus 300 by reading the QR code 402, by using the camera 107. By pressing a button 403, the user can change the displayed QR code to the QR code for direct connection. The IP address is an example of address information. The QR code 402 may include a Media Access Control (MAC) address instead of the IP address or may include both the IP address and the MAC address.

When the user presses the button 403 in the connection screen 400, the operation unit 309 of the printing apparatus 300 displays a connection screen 410 illustrated in FIG. 4B. The connection screen 410 displays the QR code for direct connection. The connection screen 410 is displayed by the operation unit 309 of the printing apparatus 300. In addition to the IP address of the printing apparatus 300, the QR code for direct connection includes an SSID and a security key of an access point for allowing the portable terminal 100 to wirelessly connect to the printing apparatus 300. The SSID and the security key included in the QR code for direct connection are an SSID and a security key generated by the printing apparatus 300 when the wireless LAN I/F 305 starts operations in the software access point mode. The portable terminal 100 that has read the QR code for direct connection displays on the operation panel 104 the SSID and the security key included in the QR code. The portable terminal 100 further stores in the clipboard the security key included in the QR code.

An item 411 in the connection screen 410 illustrated in FIG. 4B displays the SSID and the security key generated by the printing apparatus 300, and the IP address to be used by the printing apparatus 300 operating in the software access point mode. A QR code 412 is a QR code for direct connection. The QR code 412 includes the SSID and the security key generated by the printing apparatus 300, and the IP address to be used by the printing apparatus 300 operating in the software access point mode. By reading the QR code 412 by using the camera 107, the portable terminal 100 can acquire the SSID and the security key generated by the printing apparatus 300, and the IP address to be used by the printing apparatus 300 operating in the software access point mode. By pressing a button 413, the user can change the displayed QR code to the QR code for infrastructure connection. The IP address is an example of address information. The QR code 412 may include the MAC address instead of the IP address or may include both the IP address and the MAC address.

Processing performed by the portable terminal 100 to read a QR code displayed by the printing apparatus 300 and make an attempt to connect to the printing apparatus 300 will be described below with reference to FIG. 5. Each step in the flowchart illustrated in FIG. 5 is processed when the CPU 101 loads into the RAM 102 a control program stored in a memory, such as the flash memory 103, and then executes the program. The portable terminal 100 may be configured in such a way that the CPU 101 executes at least some steps in the flowchart illustrated in FIG. 5 and another CPU (not illustrated) different from the CPU 101 may execute the remaining steps.

Figure 6A:
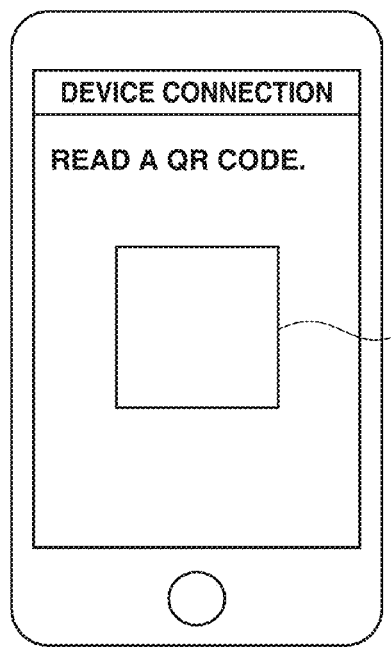
FIGS. 6A, 6B, and 6C are diagrams each illustrating a screen displayed by the portable terminal.

First, the user operates the portable terminal 100 to display an application screen 600 illustrated in FIG. 6A on the portable terminal 100. The application screen 600 illustrated in FIG. 6A offered by the print application 202 is displayed on the operation panel 104 of the portable terminal 100. The image currently being captured by the camera 107 is displayed on the application screen 600. When the print application 202 recognizes that a QR code is included in an area 601, the print application 202 reads the QR code and analyzes the read QR code.

When the portable terminal 100 displays the application screen 600 illustrated in FIG. 6A, the processing in the flowchart illustrated in FIG. 5 is executed. In step S501, the print application 202 determines whether the print application 202 has recognized a QR code. In a case where the print application 202 recognizes a QR code in the area 601 of the application screen 600 (YES in step S501), the processing proceeds to step S502. On the other hand, in a case where the print application 202 has not recognized a QR code (NO in step S501), the print application 202 waits until the print application 202 recognizes the QR code. The above-described processing in step S501 is implemented by the CPU 101.

In step S502, the print application 202 reads the recognized QR code and then analyzes the QR code. The above-described processing in step S502 is implemented by the CPU 101.

In step S503, the print application 202 determines whether the read QR code is a QR code for direct connection or a QR code for infrastructure connection. In a case where the read QR code is a QR code for direct connection (FOR DIRECT CONNECTION in step S503), the processing proceeds to step S504. On the other hand, in a case where the read QR code is a QR code for infrastructure connection (FOR INFRASTRUCTURE CONNECTION in step S503), the processing proceeds to step S507. According to the present exemplary embodiment, in a case where the read QR code includes an SSID, the print application 202 determines that the read QR code is a QR code for direct connection (FOR DIRECT CONNECTION in step S503). On the other hand, in a case where the read QR code does not include an SSID, the print application 202 determines that the read QR code is a QR code for infrastructure connection (FOR INFRASTRUCTURE CONNECTION in step S503). The above-described processing in step S503 is implemented by the CPU 101.

Figure 6B:

In step S504, the print application 202 displays an SSID and a security key extracted by analyzing the read QR code. The print application 202 requests the OS 201 to display the SSID and the security key extracted from the QR code. Then, the OS 201 displays the SSID and the security key extracted from the QR code on the operation panel 104 of the portable terminal 100. The screen displayed in step S504 is an application screen 610 illustrated in FIG. 6B. The application screen 610 illustrated in FIG. 6B is provided by the print application 202, and displays the SSID and the security key extracted from the QR code. The above-described processing in step S504 is implemented by the CPU 101.

In step S505, the print application 202 stores the security key extracted from the QR code in the clipboard. When the camera 107 of the portable terminal 100 reads the QR code 412 illustrated in FIG. 4B, "ef83w6f6ff" is stored in the clipboard in step S505.

Figure 6C:
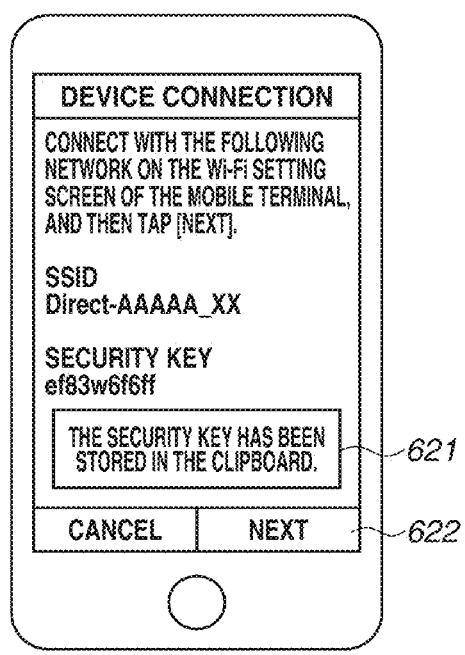

When the print application 202 has stored the security key extracted from the QR code in the clipboard, the print application 202 requests the OS 201 to notify the user that the security key has been stored in the clipboard. Then, the OS 201 displays an application screen 620 illustrated in FIG. 6C on the operation panel 104 of the portable terminal 100. The application screen 620 displays a message 621 to notify the user that the security key has been stored in the clipboard. The message 621 allows the user to know that the security key has been stored in the clipboard. The above-described processing in step S505 is implemented by the CPU 101.

Since the screen transition from the application screen 610 to the application screen 620 is performed in a very short time, some users may feel that the application screen 610 is not displayed. In the above-described configuration, the security key is automatically stored in the clipboard in step S505. However, before storing the security key in the clipboard, the print application 202 may make an inquiry to the user about whether to store the security key in the clipboard.

Figure 7A:
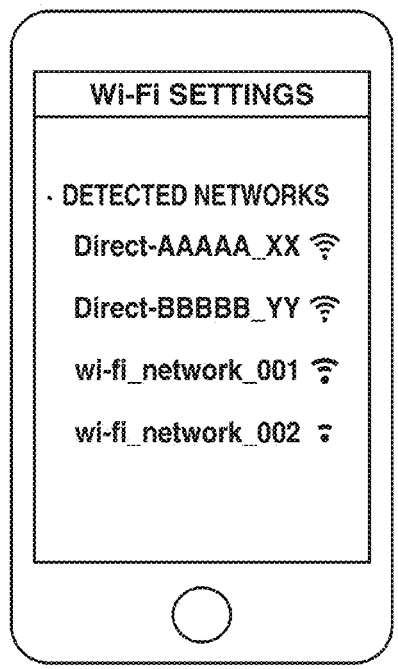
FIGS. 7A, 7B, 7C, and 7D are diagrams each illustrating a screen displayed by the portable terminal.

A procedure in which the user actually uses the security key stored in the clipboard will be described below. A Wi-Fi setting screen 700 illustrated in FIG. 7A provided by the OS 201 is displayed on the operation panel 104 of the portable terminal 100. The Wi-Fi setting screen 700 displays a list of SSIDs of access points around the portable terminal 100. The user selects an SSID of a desired access point from among the SSIDs currently displayed on the Wi-Fi setting screen 700. The following descriptions are provided based on a premise that the user has selected "Direct-AAAAA_XX" which is an SSID currently displayed on the application screen 620, i.e., the SSID generated by the printing apparatus 300 operating in the software access point mode.

Figure 7B:
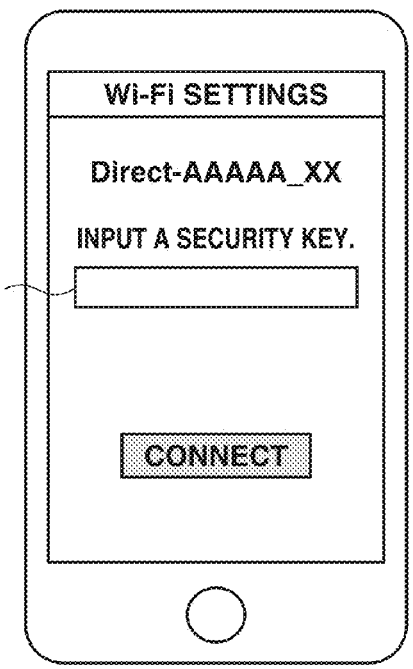

When the user selects an SSID in the Wi-Fi setting screen 700, the operation panel 104 of the portable terminal 100 displays a Wi-Fi setting screen 710 illustrated in FIG. 7B. The Wi-Fi setting screen 710 is provided by the OS 201. The Wi-Fi setting screen 710 displays an input area 711 in which the user inputs a security key. The user needs to input the security key "ef83w6f6ff" displayed on the application screen 620. According to the present exemplary embodiment, since the security key is stored in the clipboard in the processing in step S505, the user can easily input the security key in the input area 711 by performing a paste operation. Instead of performing a paste operation, the user can also input the characters of the security key one by one in the input area 711.

Figure 7C:
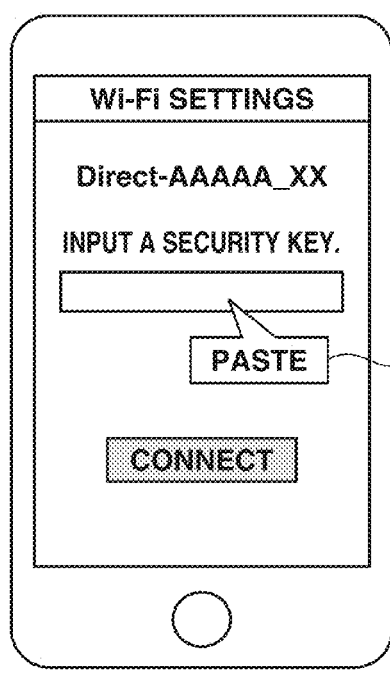
Figure 7D:
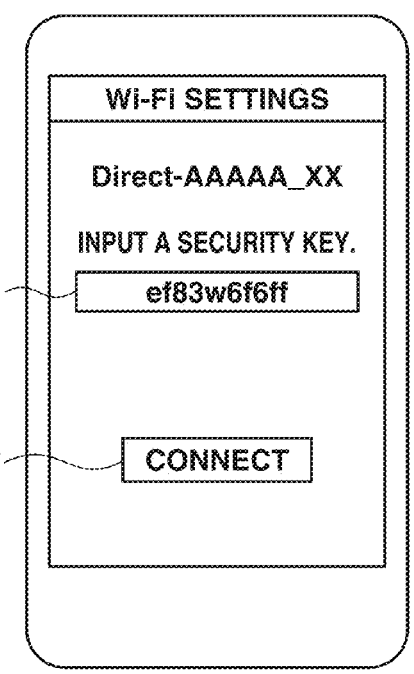

When the user performs a paste operation in the input area 711, the OS 201 displays a Wi-Fi setting screen 720 illustrated in FIG. 7C. In the Wi-Fi setting screen 720, the OS 201 displays an icon 721 for inputting the information stored in the clipboard. When the user presses the icon 721, the OS 201 displays a Wi-Fi setting screen 730 illustrated in FIG. 7D. The information stored in the clipboard, i.e., the security key "ef83w6f6ff" stored through a paste operation by the user, is input (written) in an input area 731 of the Wi-Fi setting screen 730. Depending on the specifications of the portable terminal 100, the information input in the input area 731 may be displayed as "**********". When the user presses a connect button 732, the portable terminal 100 wirelessly connects to the access point having the SSID "Direct-AAAAA_XX" using the security key input in the input area 731.

The flowchart illustrated in FIG. 5 will be described again below. In step S506 illustrated in FIG. 5, the print application 202 determines whether to start device search. In a case where the user presses an icon 622 in the application screen 620 illustrated in FIG. 6C, the print application 202 determines to start device search (YES in step S506), and the processing proceeds to step S507. On the other hand, in a case where the user does not press the icon 622 in the application screen 620 illustrated in FIG. 6C (NO in step S506), the print application 202 waits until the user presses the icon 622. When the portable terminal 100 reads an QR code for direct connection, the user needs to instruct the portable terminal 100 to wirelessly connect to the printing apparatus 300 according to the procedures described with reference to FIGS. 7A to 7D and then press the icon 622.

Figure 8A:
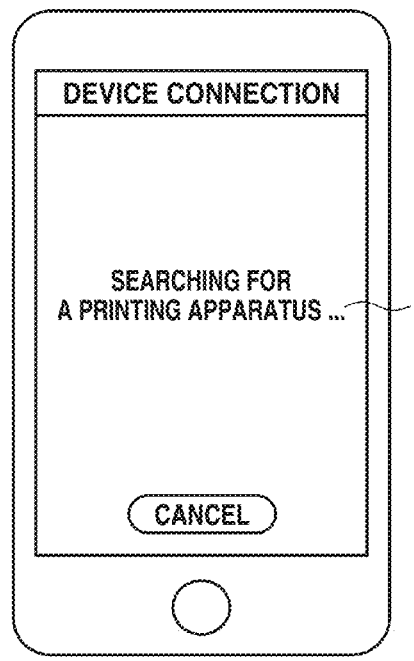
FIGS. 8A, 8B, and 8C are diagrams each illustrating a screen displayed by the portable terminal.

Step S507 will be described below. In step S507, the print application 202 performs device search. The print application 202 requests the OS 201 to search for a device having the IP address included in the read QR code. Then, the OS 201 controls the wireless LAN I/F 109 to transmit a search packet for searching for a device on the network to which the portable terminal 100 is connected. While the print application 202 is performing device search, the operation panel 104 of the portable terminal 100 displays an application screen 800 illustrated in FIG. 8A. The application screen 800 is provided by the print application 202 and displays a message 801 indicating that device search is currently being performed.

In a case where the QR code read by the portable terminal 100 is a QR code for direct connection, the wireless LAN I/F 109 is wirelessly connected to the printing apparatus 300. Therefore, a search packet transmitted by the portable terminal 100 reaches the printing apparatus 300, and then a response packet is returned from the printing apparatus 300 to the portable terminal 100.

In a case where the QR code read by the portable terminal 100 is a QR code for infrastructure connection, the wireless LAN I/F 109 transmits a search packet to the network to which the wireless LAN I/F 109 is connected. If the printing apparatus 300 exists in the network to which the wireless LAN I/F 109 is connected, a search packet transmitted by the portable terminal 100 reaches the printing apparatus 300, and the printing apparatus 300 returns a response packet to the portable terminal 100. On the other hand, if the printing apparatus 300 does not exist in the network to which the wireless LAN I/F 109 is connected, a search packet transmitted by the portable terminal 100 does not reach the printing apparatus 300, and the portable terminal 100 does not receive a response packet corresponding to the search packet. If the wireless LAN I/F 109 is not connected to any network, the printing apparatus 300 does not return a response packet corresponding to the search packet to the portable terminal 100. The above-described processing in step S508 is implemented by the CPU 101.

Step S509 will be describe below. In step S509, the print application 202 determines whether a device having the IP address included in the read QR code, i.e., the printing apparatus 300, was found. In a case where the portable terminal 100 receives a response packet corresponding to the search packet, the print application 202 determines that the printing apparatus 300 was found (YES in step S509). Then, the processing proceeds to step S510. On the other hand, in a case where the portable terminal 100 does not receive a response packet corresponding to the search packet and a predetermined time period (for example, 30 seconds) has elapsed, the print application 202 determines that the printing apparatus 300 is not found (NO in step S509). Then, the processing proceeds to step S511. The above-described processing in step S509 is implemented by the CPU 101.

Figure 8B:
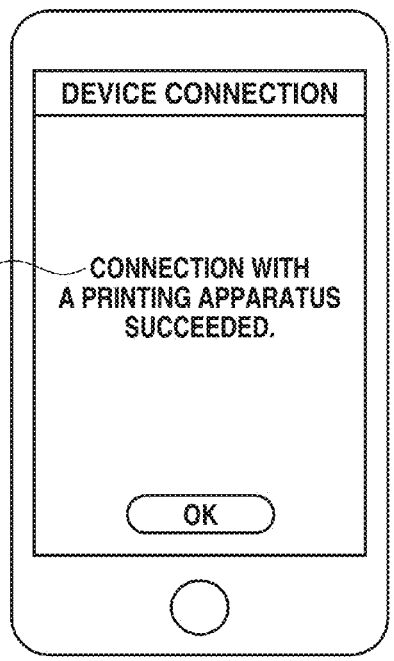

Step S510 will be described below. In step S510, the print application 202 connects to the device found in device search, i.e., the printing apparatus 300. The print application 202 requests the OS 201 to establish a Hypertext Transfer Protocol (HTTP) connection between the portable terminal 100 and the printing apparatus 300. Then, the OS 201 controls the wireless LAN I/F 109 to establish an HTTP connection between the portable terminal 100 and the printing apparatus 300. When a HTTP connection is established between the portable terminal 100 and the printing apparatus 300, the operation panel 104 of the portable terminal 100 displays an application screen 810 illustrated in FIG. 8B. The application screen 810 is provided by the print application 202 and displays a message 811 indicating that the connection to the target device has succeeded. The above-described processing in step S510 is implemented by the CPU 101.

Figure 8C:
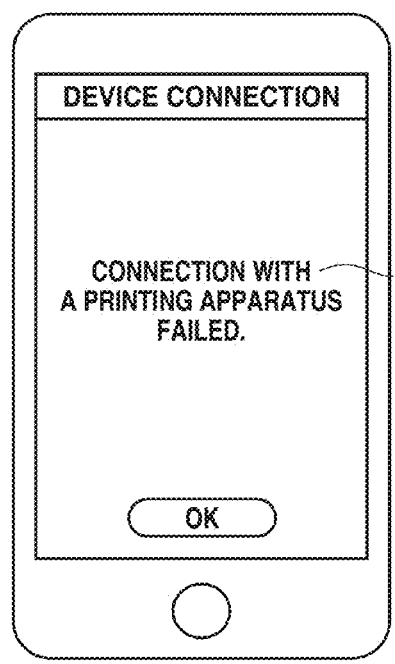

Step S511 will be described below. In step S511, the print application 202 displays an error screen indicating that the connection to the target device has failed. The error screen displayed in step S511 is illustrated in FIG. 8C. An application screen 820 illustrated in FIG. 8C is the error screen and is provided by the print application 202. The application screen 820 displays a message 821 indicating that the connection to the target device has failed. The above-described processing in step S511 is implemented by the CPU 101.

As described above, the present exemplary embodiment is characterized in that, in a case where a read QR code includes a security key, the security key is stored in a clipboard. This allows the user to easily input the security key by performing a paste operation, which saves the trouble of memorizing or taking a note of the security key. If the user inputs characters of the security key one by one, an input error is likely to occur. The present exemplary embodiment allows the user to easily input the security key by performing a paste operation, an input error is thus prevented from occurring.

A second exemplary embodiment will be described below. In the second exemplary embodiment, the portable terminal 100 acquires connection information from an external source through Bluetooth Low Energy (hereinafter referred to as BLE) which is a different type of wireless communication from wireless LAN communication. The configurations of the portable terminal 100 and the printing apparatus 300 according to the second exemplary embodiment are similar to the configurations according to the first exemplary embodiment, and redundant descriptions thereof will be omitted.

The bluetooth I/F 108 of the portable terminal 100 and the bluetooth I/F 306 of the printing apparatus 300 support BLE. The bluetooth I/F 306 of the printing apparatus 300 is transmitting a BLE advertizing packet to surrounding devices. The bluetooth I/F 108 of the portable terminal 100 receives the advertizing packet.

Figure 9:
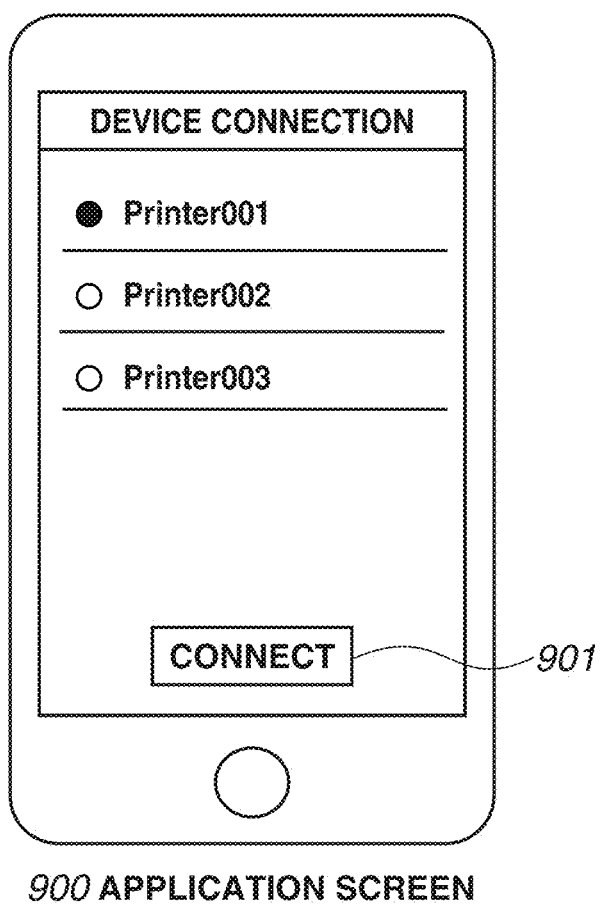
FIG. 9 is a diagram illustrating a screen displayed by the portable terminal.

The print application 202 displays a list of surrounding devices based on received advertizing packets. An application screen 900 illustrated in FIG. 9 is provided by the print application 202 and displays a list of surrounding devices. The model name of a device is included in each advertizing packet, and is displayed on the application screen 900. In the application screen 900, the user selects a desired device from a plurality of devices displayed and then presses the connect button 901. The application screen 900 illustrated in FIG. 9 indicates a case where the user has selected "Printer001" as an example.

Processing in which the portable terminal 100 acquires connection information from the printing apparatus 300 based on BLE, and the portable terminal 100 makes an attempt to connect to the printing apparatus 300 will be described below with reference to FIG. 10. Each step in the flowchart illustrated in FIG. 10 is processed when the CPU 101 loads into the RAM 102 a control program stored in a memory, such as the flash memory 103, and then executes the program. The portable terminal 100 may be configured in such a way that the CPU 101 executes at least some steps in the flowchart illustrated in FIG. 10 and another CPU (not illustrated) different from the CPU 101 may execute the remaining steps. Steps in the flowchart illustrated in FIG. 10 having the same step number as steps in the flowchart illustrated in FIG. 5 perform similar processing to these steps, and redundant descriptions thereof will be omitted. The processing in the flowchart illustrated in FIG. 10 is executed when the print application 202 displays the application screen 900.

In step S1001, the print application 202 determines whether the user has selected a device. In a case where the user selects a device and then presses the connect button 901 in the application screen 900, the print application 202 determines that the user has selected a device (YES in step S1001), and the processing proceeds to step S1002. On the other hand, in a case where the user has not selected a device, the print application 202 waits until the user selects a device. The above-described processing in step S1001 is implemented by the CPU 101.

Step S1002 will be described below. In step S1002, the print application 202 acquires connection information from the device selected by the user. The print application 202 requests the OS 201 to acquire connection information from the device selected by the user. Then, the OS 201 controls the bluetooth I/F 108 to request the device selected by the user for connection information. The bluetooth I/F 108 requests the device selected by the user for connection information using Generic Attribute Profile (GATT) communication of BLE. Then, as a response to the request, the bluetooth I/F 108 acquires connection information from the device. The OS 201 transfers the acquired connection information to the print application 202. The above-described processing in step S1002 is implemented by the CPU 101.

According to the present exemplary embodiment, connection information acquired from a device through BLE is either connection information for direct connection or connection information for infrastructure connection. Connection information for direct connection includes an SSID of an access point, a security key required for connection to the access point, and an IP address of a device. An SSID and a security key included in connection information for direct connection are an SSID and a security key generated when a device operates in the software access point mode. On the other hand, connection information for infrastructure connection includes an IP address of a device, and does not include an SSID of an access point and a security key required for connection to the access point.

Step S1003 will be described below. In step S1003, the print application 202 determines whether the connection information acquired from the device through BLE is connection information for direct connection or connection information for infrastructure connection. In a case where the connection information acquired from the device through BLE is connection information for direct connection (FOR DIRECT CONNECTION in step S1003), the processing proceeds to step S1004. On the other hand, in a case where the connection information acquired from the device through BLE is connection information for infrastructure connection (FOR INFRASTRUCTURE CONNECTION in step S1003), the processing proceeds to step S507. According to the present exemplary embodiment, if connection information acquired from a device through BLE includes an SSID, the print application 202 determines that the acquired connection information is connection information for direct connection. On the other hand, if connection information acquired from a device through BLE does not include an SSID, the print application 202 determines that the acquired connection information is connection information for infrastructure connection. The above-described processing in step S1003 is implemented by the CPU 101.

Step S1004 will be described below. In step S1004, the print application 202 displays an SSID and a security key included in the acquired connection information. The print application 202 requests the OS 201 to display the SSID and the security key included in the acquired connection information. Then, the OS 201 displays the SSID and the security key included in the acquired connection information on the operation panel 104 of the portable terminal 100. In this case, an application screen 610 illustrated in FIG. 6B is displayed. The above-described processing in step S1004 is implemented by the CPU 101.

In step S1005, the print application 202 stores in the clipboard the security key included in the acquired connection information. This processing is similar to that in step S505 illustrated in FIG. 5. The operation panel 104 of the portable terminal 100 displays the application screen 620 illustrated in FIG. 6C. The above-described processing in step S1005 is implemented by the CPU 101.

The present exemplary embodiment is characterized in that, in a case where connection information acquired through BLE includes a security key, the security key is stored in a clipboard. This allows the user to easily input the security key by performing a paste operation, which saves the trouble of memorizing or taking a note of the security key. If the user inputs characters of the security key one by one, the user is likely to make an input error. The present exemplary embodiment allows the user to easily input the security key by performing a paste operation, an input error thus prevented from occurring.

A third exemplary embodiment will be described below. In the third exemplary embodiment, the portable terminal 100 acquires connection information from an external NFC tag through NFC which is a different type of wireless communication from wireless LAN communication. The configurations of the portable terminal 100 and the printing apparatus 300 according to the third exemplary embodiment are similar to the configurations according to the first exemplary embodiment, and redundant descriptions thereof will be omitted.

FIG. 11 is a flowchart illustrating processing in which the portable terminal 100 acquires connection information from an external NFC tag through NFC, and then makes an attempt to connect to the printing apparatus 300. Each step in the flowchart illustrated in FIG. 11 is processed when the CPU 101 loads into the RAM 102 a control program stored in a memory, such as the flash memory 103, and then executes the program. The portable terminal 100 may be configured in such a way that the CPU 101 executes at least some steps in the flowchart illustrated in FIG. 11 and another CPU (not illustrated) different from the CPU 101 may execute the remaining steps. Steps in the flowchart illustrated in FIG. 11 having the same step number as steps in the flowchart illustrated in FIG. 5 perform similar processing to these steps, and redundant descriptions thereof will be omitted. The processing in the flowchart illustrated in FIG. 11 is executed when the print application 202 is activated on the portable terminal 100.

In step S1101, the print application 202 determines whether an NFC tag has been detected. In a case where the NFC reader 110 detects an NFC tag, the processing proceeds to step S1102. On the other hand, in a case where the NFC reader 110 has not detected an NFC tag, the print application 202 waits until the NFC reader 110 detects an NFC tag. The above-described processing in step S1101 is implemented by the CPU 101.

Step S1102 will be described below. In step S1102, the print application 202 acquires connection information stored in the external NFC tag. The connection information acquired from the NFC tag by the NFC reader 110 is transferred from the OS 201 to the print application 202. Then, the print application 202 acquires the connection information. The above-described processing in step S1102 is implemented by the CPU 101.

According to the present exemplary embodiment, connection information acquired from an external NFC tag through NFC is either connection information for direct connection or connection information for infrastructure connection. Connection information for direct connection includes an SSID of an access point, a security key required for connection to the access point, and an IP address of a device. An SSID and a security key included in connection information for direct connection are generated when a device operates in the software access point mode. On the other hand, connection information for infrastructure connection includes an IP address of a device, and does not include an SSID of an access point and a security key required for connection to the access point.

Step S1103 will be described below. In step S1103, the print application 202 determines whether the connection information acquired from the external NFC tag through NFC is connection information for direct connection or connection information for infrastructure connection. In a case where the connection information acquired from the external NFC tag through NFC is connection information for direct connection (FOR DIRECT CONNECTION in step S1103), the processing proceeds to step S1104. On the other hand, in a case where the connection information acquired from the external NFC tag through NFC is connection information for infrastructure connection (FOR INFRASTRUCTURE CONNECTION in step S1103), the processing proceeds to step S507. According to the present exemplary embodiment, if connection information acquired from an external NFC tag through NFC includes an SSID, the print application 202 determines that the acquired connection information is connection information for direct connection. On the other hand, if connection information acquired from an external NFC tag through NFC does not include an SSID, the print application 202 determines that the acquired connection information is connection information for infrastructure connection. The above-described processing in step S1103 is implemented by the CPU 101.

Step S1104 will be described below. In step S1104, the print application 202 displays the SSID and the security key included in the connection information acquired from the external NFC tag. The print application 202 requests the OS 201 to display the SSID and the security key included in the acquired connection information. Then, the OS 201 displays the SSID and the security key included in the acquired connection information on the operation panel 104 of the portable terminal 100. In this case, the application screen 610 illustrated in FIG. 6B is displayed. The above-described processing in step S1104 is implemented by the CPU 101.

In step S1105, the print application 202 stores in the clipboard the security key included in the acquired connection information. This processing is similar to that in step S505 illustrated in FIG. 5. The operation panel 104 of the portable terminal 100 displays the application screen 620 illustrated in FIG. 6C. The above-described processing in step S1105 is implemented by the CPU 101.

The present exemplary embodiment is characterized in that, in a case where connection information acquired from an external NFC tag through NFC includes a security key, the security key is stored in the clipboard. This allows the user to easily input the security key by performing a paste operation, which saves the trouble of memorizing or taking a note of the security key. If the user inputs characters of the security key one by one, the user is likely to make an input error. The present exemplary embodiment allows the user to easily input the security key by performing a paste operation, an input error is thus prevented from occurring.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-060646, filed Mar. 24, 2016, which is hereby incorporated by reference herein in its entirety.

What is claimed is:

1. A control method executed by a communication apparatus having a wireless local area network (LAN) function for connecting to an access point and performing wireless communication, the control method comprising:

analyzing a two-dimensional code read by the communication apparatusto obtain data from the two-dimensional code;

determining whether the data obtained by analyzing the two-dimensional code includes both of a service set identifier (SSID) and a security key for connecting to an access point of the SSID;

automatically storing, in a case where the obtained data includes both of the service set identifier (SSID) and the security key for connecting to the access point, the obtained security key in a clipboard without a copy operation by a user, wherein the obtained SSID is not stored automatically in the clipboard, and wherein the security key stored in the clipboard is pasted on an area specified by the user when the user performs a paste operation on the specified area for enabling connection to the access point of the obtained SSID; and performing, in a case where the obtained data includes an internet protocol (IP) address and doesn't include both of the SSID and the security key, a device search for connecting to a device indicated by the internet protocol (IP) address included in the obtained data.

2. The control method according to claim 1, wherein in response to automatically storing the obtained security key in a clipboard without the copy operation by the user, a message is displayed to notify the user that the security key has been stored in the clipboard.

3. The control method according to claim 2, wherein, in addition to the message, the obtained SSID and the obtained security key are further displayed.

4. The control method according to claim 1, wherein, in a case where the obtained data include both of the SSID and the security key for connecting to the access point of the SSID and where the two-dimensional code is a two-dimensional code for direct connection for directly establishing wireless connection between the communication apparatus and an external apparatus via the access point, the security key is automatically stored in the clipboard without the copy operation by the user.

5. The control method according to claim 1,
wherein it is determined in the determining step whether the two-dimensional code is a two-dimensional code of a first type that includes both of the SSID and the security key, or a two-dimensional code of a second type that don't include both of the SSID and the security key.

6. The control method according to claim 1, wherein the two-dimensional code is a quick response (QR) code.

7. A communication apparatus having a wireless local area network (LAN) function for connecting to an access point and performing wireless communication, the communication apparatus comprising:
- a memory that stores a computer program; and
- a processor that executes the computer program to perform:
  - analyzing a two-dimensional code to obtain data from the two-dimensional code;
  - determining whether the data obtained by analyzing the two-dimensional code includes both of a service set identifier (SSID) and a security key for connecting to an access point of the SSID;
  - automatically storing, in a case where the obtained data includes both of the service set identifier (SSID) and the security key for connecting to the access point, the obtained security key in a clipboard without a copy operation by a user, wherein the obtained SSID is not stored automatically in the clipboard, and
  - wherein the security key stored in the clipboard is pasted on an area specified by a user when the user performs a paste operation on the specified area for enabling connection to the access point of the obtained SSID; and
  - performing, in a case where the obtained data includes an internet protocol (IP) address and doesn't include both of the SSID and the security key, a device search for connecting to a device indicated by the internet protocol (IP) address included in the obtained data.

8. The communication apparatus according to claim 7, wherein the processor further performs in response to automatically storing the obtained security key in a clipboard without the copy operation by the user, displaying a message to notify a user that the security key has been stored in the clipboard.

9. The communication apparatus according to claim 8, wherein, in addition to the message, the processor further performs displaying the obtained SSID and the obtained security key.

10. The communication apparatus according to claim 7, wherein, in a case where the obtained data include both of the SSID and the security key for connecting to the access point of the SSID and where the two-dimensional code is a two-dimensional code for direct connection which is for directly establishing wireless connection between the communication apparatus and an external apparatus via the access point, the processor automatically stores the security key in the clipboard.

11. The communication apparatus according to claim 7, wherein the processor further performs determining whether the two-dimensional code is a two-dimensional code of a first type that includes both of the SSID and the security key, or a two-dimensional code of a second type that don't include both of the SSID and the security key.

12. The communication apparatus according to claim 7, wherein the two-dimensional code is a quick response (QR) code.

13. A non-transitory computer-readable medium storing a control program that, when implemented by a communication apparatus, causes the communication apparatus to perform:
- analyzing a two-dimensional code to obtain data from the two-dimensional code;
- determining whether the data obtained by analyzing the two-dimensional code includes both of a service set identifier (SSID) and a security key for connecting to an access point of the SSID;
- automatically storing, in a case where the obtained data includes both of the service set identifier (SSID) and the security key for connecting to the access point, the obtained security key in a clipboard without a copy operation by a user, wherein the obtained SSID is not stored automatically in the clipboard, and
- wherein the security key stored in the clipboard is pasted on an area specified by a user when the user performs a paste operation on the specified area for enabling connection to the access point of the obtained SSID; and
- performing, in a case where the obtained data includes an internet protocol (IP) address and doesn't include both of the SSID and the security key, a device search for connecting to a device indicated by the internet protocol (IP) address included in the obtained data.

* * * * *